Aug. 5, 1969        J. C. CROFT        3,459,229
PRESSURE TESTING APPARATUS
Filed June 15, 1966
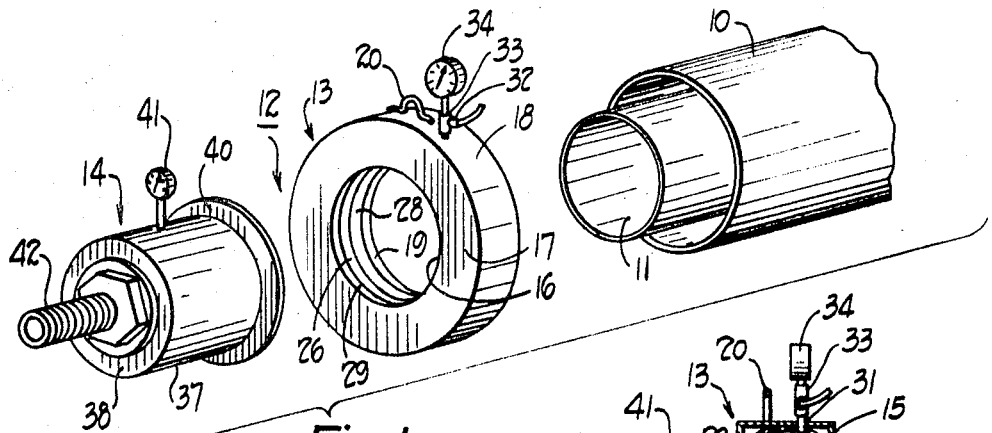
Fig. 1
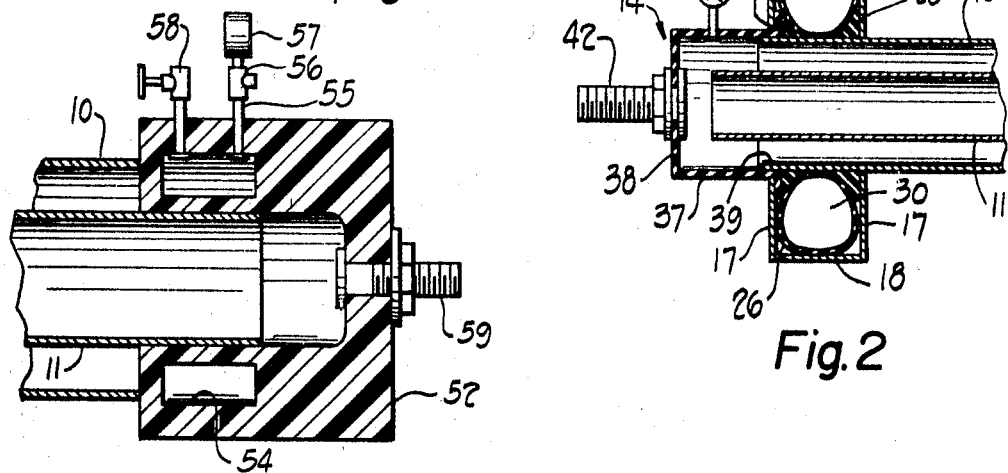
Fig. 2
Fig. 4
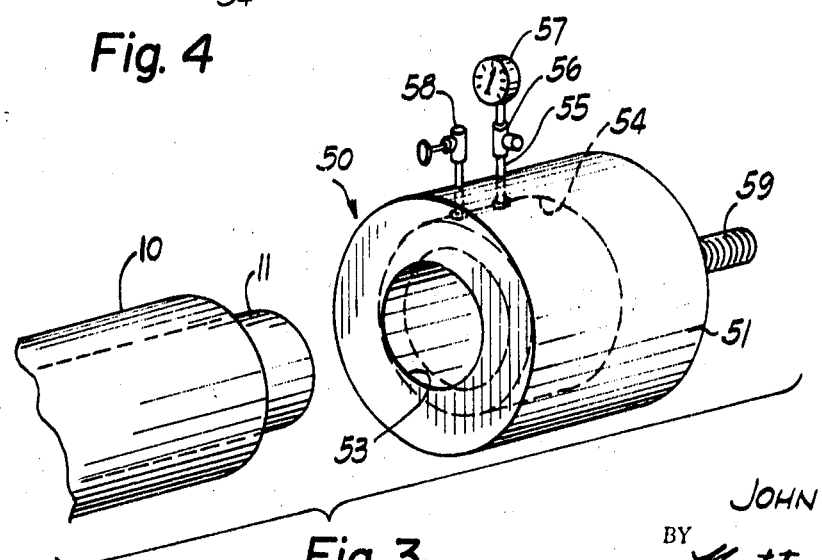
Fig. 3
INVENTOR.
JOHN C. CROFT
BY *Watts & Fisher*
ATTORNEYS.

United States Patent Office 3,459,229
Patented Aug. 5, 1969

3,459,229
PRESSURE TESTING APPARATUS
John C. Croft, Barberton, Ohio, assignor to
New England Realty Co.
Filed June 15, 1966, Ser. No. 557,715
Int. Cl. F16l 55/12
U.S. Cl. 138—90                                          9 Claims

ABSTRACT OF THE DISCLOSURE

Apparatus for use in the pressure testing of tubes having an annular portion including an annular expansible chamber and a flexible peripheral wall, the annular portion being engageable around a tube to be tested and the expansible chamber being inflatable to cause the flexible wall to grip the tube, and a closed end portion defining a cavity for sealing the end of a tube inserted through the annular portion and for retaining a pressure testing fluid or gas introduced into the tube.

---

This invention relates generally to the pressure testing of pipes, conduit and other tubular members for leaks, and more specifically to new apparatus which is externally mounted on the ends of tubes so that they can be pressurized pneumatically and hydrostatically.

The invention is particularly concerned with apparatus which facilitates the testing of prefabricated conduit systems of the type including an outer metal casing and one or more fluid conducting pipes which are supported in spaced relation with the surrounding casing. Conduits of this type are commonly used in central underground and overhead heating systems. A typical conduit is constructed in sections which are prefabricated at the factory and then transported to the site of installation where the sections are joined together to form a continuous system. Each prefabricated section includes a length of the outer casing, the inner pipe or pipes which project beyond the ends of the casing section and pipe supports which support the pipe within the casing section. In joining the conduit sections it is the practice first to weld together the projecting ends of the pipe of two adjacent sections. The ends of the casing sections are then drawn together over the weld area and are connected by a welded connector band, bolts or other suitable means.

A conduit system is usually pressure tested at the site of installation to detect leaks. The pipe is internally pressurized hydrostatically at a relatively high pressure, for example, 500 p.s.i., to detect any leaks in the welded areas of the pipe ends. In a separate operation the joints of the casing are coated with a soap solution or the like and the casing is internally pressurized pneumatically at a relatively low pressure, for example, 15 p.s.i., to insure that no leakage occurs in the joints.

A conventional device which has been used to close the end of the pipe and the casing for the hydrostatic and pneumatic tests consisted of a can having a radial flange around its open end and a sealing gasket mounted on the face of the flange in position to abut the end of the pipe or casing. In use rings were welded around the ends of the pipe and casing and the flanges of the cans were secured to the rings by bolts or other means. After the testing operations were completed, it was necessary to burn the rings off the ends of the pipe and casing. The use of this conventional device was complicated and time-consuming because of the difficulties involved in securing the can in position.

The present invention provides new pressure testing devices which can be easily and quickly mounted on the ends of pipe and casing so that the members can be internally pressurized to the desired pressure. The new devices are constructed so that they can be externally mounted in a convenient manner without the need of special fixtures or other means, such as rings welded on the pipe and casing, to hold the devices in position.

The new device includes a cylindrical portion which is provided with a center opening and is engageable around the end of a pipe or casing. The cylindrical portion has an annular pressure chamber defined by at least one flexible wall which is expanded by the introduction of a suitable fluid or gas which may be at a higher pressure than the testing fluid or gas. A second portion extends from the first portion to seal the end of the pipe or casing so that the testing fluid or gas is retained therein. The expansion of the annular chamber causes the first portion to grip the casing or pipe walls so that the device is securely held in position and a fluid or gas-tight seal is obtained.

In one preferred embodiment the cylindrical gripping portion of the device comprises an annular housing and an endless rubber tube which is mounted in the housing to form the pressure chamber. The second portion of the device comprises a separate closure member having a closed end and a flanged open end which fits into the housing and is retained therein by expansion of the tube. This embodiment is especially useful for air testing the conduit casing.

In another preferred embodiment the first and second portions of the device are formed by an integral member having an end wall, a cylindrical, flexible side wall and an open end. The annular pressure chamber is formed in the side wall so that the inner surface of the wall can be tightly engaged around the pipe or casing received through the open end by expansion of the chamber.

The term "tube" as used in the following specification and claims is intended to encompass pipes, casing and similar members which may be subjected to pressure testing.

Other advantages and a fuller understanding of the invention will be had from the following detailed description when taken in conjunction with the accompanying drawings.

In the drawings:

FIGURE 1 is an exploded, perspective view of one embodiment of the invention associated with the end portion of a typical conduit;

FIGURE 2 is a vertical cross-sectional view showing the apparatus of FIG. 1 mounted on the end of the conduit casing;

FIGURE 3 is an exploded, perspective view of another embodiment of the invention associated with an end portion of a conduit; and, FIGURE 4 is a vertical cross-sectional view showing the apparatus of FIG. 3 mounted on the end of the conduit pipe.

Referring now to the drawings, and to FIGS. 1 and 2 in particular, there is shown a fragmentary portion of a typical conduit which includes a casing 10 and a fluid or gas conducting pipe 11. The pipe 11 is mounted centrally within the casing 10 and the end portions of the pipe project a short distance from the ends of the casing. The new apparatus of this invention which can be used to pressure test the conduit is generally designated by reference numeral 12.

The apparatus 12 is preferably pneumatically operated and is particularly useful for air testing the casing 10. As generally described above, the apparatus 12 is comprised of a cylindrical portion 13 which is engageable around the walls of the casing 10 and an end portion 14 extending from the portion 13 to form a cavity for sealing the end of the casing 10 and retaining a pressure testing fluid or gas introduced therein.

In the embodiment of FIGS. 1 and 2, the cylindrical portion 13 comprises an annular housing 15 having a center opening 16. As shown, the housing 15 is constructed with spaced side walls 17 in the form of rings which are made of a suitable rigid material, such as steel plate or the like. The rings or side walls 17 are connected by an endless peripheral wall 18 which also can be made of steel plate and welded to the side walls. The inner peripheral surfaces of the rings or side walls 17 cooperate to define the center opening 16 and the portion of the housing 15 circumscribing this opening is open, as shown at 19. If desired, a handle 20 may be secured to the peripheral wall 18 so that the housing 15 can be conveniently slid on the end of the casing 10.

The cylindrical portion 13 of the apparatus 12 further includes a flexible wall at the open portion 19 of the housing 15 around the opening 16. In the illustrated construction the flexible wall is formed by an endless inflatable tube 26 which may be made of rubber or a similar material. Annular retainers 28 and 29 made of a soft material such as rubber or the like may be suitably mounted adjacent the inner surfaces of the side walls 17 to hold the tube 26 within the housing 15. The tube 26 defines an annular pressure chamber 30 which is provided with an inlet 31 that extends outwardly of the peripheral housing wall 18. A conventional air valve 32 of the automotive type including a valve stem is connected to the inlet 31 by a T fitting 33. As shown, the fitting 33 also mounts a suitable pressure gauge 34.

The end portion 14 of the apparatus 12 is a unitary member that is preferably made of rubber or the like. The unitary member 14 comprises a cylindrical side wall 37, an end wall 38 and an open end 39 opposite to the end wall. A radial flange 40 extends from the side wall 37 around the open end 39 of the member 14. The flanged open end 39 of the member 14 is shaped to fit within the opening 16 of the housing 15 and to be retained therein by expansion of the tube 26. If desired, the end member 14 may be provided with a pressure gauge 41 and with a fitting 42 in the end wall 38 through which a testing fluid or gas can be introduced into the casing 10 when the member 14 is mounted over its end.

In use the housing 15 with the internally mounted tube 26 is easily slid over the open end of the conduit casing 10. The flanged open end 39 of the member 14 is inserted within the housing 15 as shown in FIG. 2 so that the flange 40 is between the tube 26 and the inner surface of one of the side walls or rings 17. When the member 14 is mounted on the casing 10, it extends from the housing 15 to accommodate the projecting end of the pipe 11 and closes the open end of the casing.

The tube 26 is substantially inflated, preferably by air. The inflation of the tube 26 affects a tight grip around the walls of the casing 10 and serves to retain the flanged end of the member 14 within the housing 15. It has been found that the tube 26 need be inflated to a greater pressure than the testing pressure in order to maintain the apparatus 12 on the end of the conduit casing.

Reference is now made to FIGS. 3 and 4 which show another embodiment 50 which is especially useful for hydrostatically testing the pipe 11. As thereshown the device 50 comprises an integral member having a cylindrical portion formed by a flexible tubular side wall 51 and an end portion formed by an end wall 52. The end of the member 50 opposite to the end wall 52 is open, as shown at 53. The member 50 may be constructed of fabric reinforced rubber similar to an automobile tire.

An annular water chamber 54 is formed in the side wall 51 between its inner and outer surfaces and between the ends 52 and 53. An inlet 55 is connected to the chamber 54 and is provided with a suitable one-way valve 56 through which water can be introduced into the chamber 54. A pressure gauge 57 is preferably connected to the inlet 55 in order to indicate the pressure within the chamber. As shown, a venting valve 58 also is connected to the chamber 54. The valve 58 can be opened to bleed air from the chamber 54 as it is filled with water and to release water from the chamber at the end of the test.

In use the member 50 is fitted over the end of the pipe 11 as shown in FIG. 4. When water is introduced through the valve 56 to pressurize the chamber 54, the inner surface of the member 50 is compressed around the walls of the pipe 11 to effect a water-tight seal. If desired, a conduit 59 may be connected to the end wall 52 to permit water to be introduced into the pipe.

It will be seen from the foregoing that in both embodiments of the invention there is provided a device which can be easily engaged around the end of a tube to effect a fluid or gas-tight seal therewith and to close the end of the tube for a pressure testing operation. Each device includes an annular chamber which is pressurized to hold the device on the tube and no special fixtures or other retaining means are required. When the pressure testing operation has been completed, the fluid or gas within the annular chamber can be released and the device quickly slid from the end of the tube.

Many modifications and variations of the invention will be apparent to those skilled in the art in the light of the foregoing disclosure. Therefore, it is to be understood that, within the scope of the appended claims, the invention can be practiced otherwise than as specifically shown and described.

What is claimed is:

1. Apparatus for use in the pressure testing of tubes comprising in combination an annular housing having a center hole therethrough, the portion of said housing circumscribing said hole being open, a flexible wall at said open portion of said housing around said hole, means for introducing a fluid or gas under pressure into said housing and to act on said flexible wall and cause it to expand radially inwardly of said housing, and a member having a closed end, an open end and a flange portion surrounding said open end which is shaped to fit within said hole and to be retained therein by expansion of said flexible wall.

2. Apparatus as claimed in claim 1 wherein said flexible wall is formed by an endless inflatable tube disposed within said housing.

3. Apparatus for use in the pressure testing of tubes comprising a unitary member having a flexible tubular side wall with inner and outer surfaces, an open end and a closed end, said flexible side wall including an annular pressure chamber formed between said surfaces and between said ends, and means for introducing a pressurized fluid or gas into said chamber to flex the inner surface of said wall radially inwardly.

4. Apparatus as claimed in claim 3 wherein said means for introducing a pressurized fluid or gas comprises water or gas inlet valve means, and including air vent and pressure release valve means communicating with said chamber.

5. Apparatus as claimed in claim 4 wherein said side wall is constructed of reinforced rubber.

6. Apparatus for use in the pressure testing of tubes comprising:
   (a) an annular housing adapted to be engaged around a tube,
   (b) said housing having spaced side walls in the form of rings made of rigid material, and an endless outer peripheral wall extending between and uniting said side walls,
   (c) said side walls and said peripheral wall cooperating to define an open space within said housing,
   (d) the inner peripheral edges of said side walls defining aligned openings through said side walls into said housing, (e) flexible wall means mounted within said housing between said side walls for forming an expansible annular chamber,
(f) pressure inlet means connected to said chamber so that it can be expanded to cause said flexible wall means to grip the outside of the tube inserted through said openings, and
(g) a cup-like member having a cylindrical side wall, an end wall, an open end opposite to said end wall, and radial flange means extending outwardly from said cylindrical side wall around said open end,
(h) said flange means being insertable into an opening of one of said housing end walls and being engageable between the inside surface of said one housing end wall and said flexible wall means,
(i) said cup-like member extending axially outwardly from said one end wall of said housing to form a cavity for sealing the end of a tube inserted through said openings and retaining a pressure testing fluid or gas introduced into the tube.

7. Apparatus as claimed in claim 6 wherein said flexible wall means is an inflatable tube.

8. Apparatus as claimed in claim 7 wherein said cup-like member is made of a rubber-like material.

9. Apparatus for use in the pressure testing of tubes comprising a unitary, cup-shaped member made of a rubber-like material and including a flexible tubular side wall, an annular chamber formed in said side wall, and an open end opposite to said end wall for receiving a tube to be pressure tested, and means connected to said member for pressurizing said chamber to cause the flexible side wall to expand radially inwardly and grip the outside of an inserted tube.

References Cited
UNITED STATES PATENTS

| | | | |
|---|---|---|---|
| 1,683,336 | 9/1928 | Cummings | 138—93 |
| 1,710,439 | 4/1929 | Taylor | 138—93 XR |
| 2,279,257 | 4/1942 | Svirsky | 138—93 |
| 2,655,182 | 10/1953 | Hayes et al. | 138—90 |
| 2,732,864 | 1/1956 | Stansbury | 138—93 XR |
| 3,012,433 | 12/1961 | Blafield | 73—49.1 XR |
| 3,331,238 | 7/1967 | Kost et al. | 73—49.8 XR |
| 3,339,011 | 8/1967 | Ewers et al. | 138—93 XR |

SAMUEL ROTHBERG, Primary Examiner

U.S. Cl. X.R.

73—49; 138—109